(12) United States Patent
Loutsch et al.

(10) Patent No.: US 8,512,439 B2
(45) Date of Patent: Aug. 20, 2013

(54) METHOD FOR FEEDING A BURDEN TO A BLAST FURNACE

(75) Inventors: Jeannot Loutsch, Mondercange (LU);
Jean-Paul Simoes, Walferdange (LU);
Lionel Hausemer, Steinsel (LU)

(73) Assignee: Paul Wurth S.A., Luxembourg (LU)

( * ) Notice: Subject to any disclaimer, the term of this patent is extended or adjusted under 35 U.S.C. 154(b) by 132 days.

(21) Appl. No.: 13/266,300

(22) PCT Filed: Apr. 22, 2010

(86) PCT No.: PCT/EP2010/055378
§ 371 (c)(1),
(2), (4) Date: Oct. 26, 2011

(87) PCT Pub. No.: WO2010/124992
PCT Pub. Date: Nov. 4, 2010

(65) Prior Publication Data
US 2012/0039700 A1 Feb. 16, 2012

(30) Foreign Application Priority Data
Apr. 28, 2009 (LU) .......................................... 91559

(51) Int. Cl.
*C21B 5/00* (2006.01)
*C21B 5/06* (2006.01)
*C21B 7/18* (2006.01)
*B01D 53/047* (2006.01)

(52) U.S. Cl.
USPC ....... 75/469; 75/458; 75/468; 95/96; 414/805

(58) Field of Classification Search
USPC ............................ 75/468–472; 414/800–816
See application file for complete search history.

(56) References Cited

U.S. PATENT DOCUMENTS

| 4,067,452 A | 1/1978 | Berzins |
| 4,728,240 A * | 3/1988 | Mahr et al. ...................... 414/21 |
| 6,478,841 B1 | 11/2002 | Faccone |

FOREIGN PATENT DOCUMENTS

| CN | 101058081 A | 10/2007 |
| DE | 19950101 C1 | 4/2001 |
| FR | 2859483 A1 | 3/2005 |
| JP | 58161715 A | 9/1983 |

(Continued)

OTHER PUBLICATIONS

International Search Report PCT/EP2010/055378; Dated Aug. 31, 2010.

(Continued)

*Primary Examiner* — Kaj K Olsen
*Assistant Examiner* — Jared Wood
(74) *Attorney, Agent, or Firm* — Cantor Colburn LLP

(57) ABSTRACT

The present invention proposes a method for feeding a burden to a blast furnace (32), wherein the method comprises providing a charging device (38) having at least one material hopper (40), the material hopper (40) comprising a hopper chamber (42), a material inlet aperture for feeding a burden into the hopper chamber (40), and a material discharge aperture for feeding a burden from the hopper chamber (40) to the blast furnace (32); the material inlet aperture having an associated inlet seal valve 44) for opening and closing the material inlet aperture and the material discharge aperture having an associated material discharge valve (46) for opening and closing the material discharge aperture. The method further comprises opening the material inlet aperture and closing the material discharge aperture; feeding a burden into the hopper chamber (40) through the material inlet aperture; closing the inlet seal valve (44); pressurizing the hopper chamber (40) by feeding pressurizing gas into the hopper chamber (40); and opening the material discharge valve (46) and feeding the burden from the hopper chamber (40) to the blast furnace (32). According to an important aspect of the invention, the method comprises feeding a predetermined amount of pressurized flushing gas through the hopper chamber (42) before pressurizing the hopper chamber (42), wherein the flushing gas comprises at least 75% carbon dioxide.

15 Claims, 4 Drawing Sheets

(56) References Cited

FOREIGN PATENT DOCUMENTS

LU 73752 6/1976

OTHER PUBLICATIONS

Y. Zhang, "Numerical and experimental investigation on the prevention of CO deflagration", Journal of Loss Prevention in the Process Industries, vol. 22, No. 2, Mar. 1, 2009, pp. 169-175, XP026000229.

Chinese office action for correspopnding application No. CN201080015962.4 filed Apr. 22, 2010; Mail date Feb. 16, 2013.

Lin Jie, "Top even pressure control of large blast furnace in Taiyuan iron and steel co", Metallurgical Industry Automation, vol. 30, issue 1, pp. 66-67, section 1.0 and figure 1, Considered in terms of English abstract only.

\* cited by examiner

US 8,512,439 B2

METHOD FOR FEEDING A BURDEN TO A BLAST FURNACE

TECHNICAL FIELD

The present invention generally relates to a method for feeding a burden to a blast furnace, in particular to a blast furnace with top gas recycling.

BACKGROUND

A burden, also often referred to as charge material, is fed into a blast furnace through a charging device arranged above the blast furnace. Such a charging device generally comprises one or more material hoppers for temporarily receiving the burden. The material hoppers are also used for weighing the burden contained therein and thereby control the amount of burden fed into the blast furnace.

During filling of the material hopper, the latter must be at atmospheric pressure. However, when the burden is fed into the blast furnace, the material hopper must be at blast furnace pressure. Therefore, the material hopper must be pressurized before the burden is transferred from the material hopper to the blast furnace.

This pressurization is generally carried out by feeding semi-clean top gas to the material hopper as shown in FIG. 1 and described amongst others in LU 73752. The blast furnace installation 10 comprises piping 12 for recovering top gas from a top section of the blast furnace. The recovered top gas is fed through a primary cleaning stage 14 and a secondary cleaning stage 16 before it is dried in a drying unit 18 and fed to a gas circuit 20. The secondary cleaning stage 16 comprises a primary prewashing and cooling stage 22 and a subsequent purification stage 24 wherein the gas is expanded. Semi-clean gas is extracted after the primary prewashing and cooling stage 22 and fed into a hopper chamber of a material hopper 26 for pressurizing the latter. Before the purification stage 24, the top gas is still at a relatively high pressure but must be compressed up to a pressure slightly above blast furnace pressure.

During the filling of the material hopper, air is drawn into the hopper chamber. When the material hopper is then sealed prior to pressurizing, the air gets trapped in the hopper chamber. The feeding of semi-clean gas into the hopper chamber forms a gas mixture comprising $O_2$ from the atmospheric air and combustible gases CO and $H_2$. In some cases, this gas mixture may occasionally lead to small deflagrations caused by impacting burden in the hopper. Such deflagrations should however be avoided as they may damage the material hopper.

In some cases, in particular in installations with higher CO and $H_2$ concentrations, the risk of such deflagrations gets higher. This is in particular the case for top gas recirculation installations, wherein top gas is treated and a gas rich in CO and $H_2$ is fed back into the blast furnace through the tuyere system. This inevitably leads to a higher concentration of CO and $H_2$ in the material hopper and therefore to a higher risk of deflagrations. The risk of deflagrations is also increased if natural gas is injected in high quantities.

It should also be noted that attempts have been made in recent years to reduce $CO_2$ emissions from blast furnaces so as to contribute to the general worldwide reduction of $CO_2$ emissions. More emphasis has therefore been put on top gas recirculation installations wherein blast furnace top gas is fed to a $CO_2$ removal unit wherein the $CO_2$ content in the top gas is reduced, e.g. by Pressure Swing Adsorption (PSA) or Vacuum Pressure Swing Adsorption (VPSA), as for example shown in U.S. Pat. No. 6,478,841. PSA/VPSA installations produce a first stream of gas which is rich in CO and $H_2$ and a second stream of gas rich in $CO_2$ and $H_2O$. The first stream of gas may be used as reduction gas and injected back into the blast furnace. The second stream of gas is removed from the installation and disposed of. This disposal controversially consists in pumping the $CO_2$ rich gas into pockets underground for storage.

There is a need to provide an improved method for feeding a burden into a blast furnace, while avoiding deflagrations, in particular in view of the fact that top gas recirculation installations are becoming increasingly more popular.

BRIEF SUMMARY

The invention provides an improved method for feeding a burden into a blast furnace.

The present invention proposes a method for feeding a burden to a blast furnace, wherein the method comprises providing a charging device having at least one material hopper, the material hopper comprising a hopper chamber, a material inlet aperture for feeding a burden into the hopper chamber, and a material discharge aperture for feeding a burden from the hopper chamber to the blast furnace; the material inlet aperture having an associated inlet seal valve for opening and closing the material inlet aperture and the material discharge aperture having an associated material discharge valve for opening and closing the material discharge aperture. The method further comprises opening the material inlet aperture and closing the material discharge aperture; feeding a burden into the hopper chamber through the material inlet aperture; closing the inlet seal valve; pressurizing the hopper chamber by feeding pressurizing gas into the hopper chamber; and opening the material discharge valve and feeding the burden from the hopper chamber to the blast furnace. According to an important aspect of the invention, the method further comprises feeding a predetermined amount of flushing gas through said hopper chamber before pressurizing said hopper chamber, wherein said flushing gas comprises at least 75% carbon dioxide.

By feeding a predetermined amount of $CO_2$ containing flushing gas through the hopper chamber before pressurizing, any oxygen that may be contained in the hopper chamber is pushed out by the flushing gas. Consequently, when the hopper chamber is pressurized, it is free from oxygen and the presence of CO, even in higher amounts, cannot lead to deflagrations. It should be noted that in order to flush the hopper chamber, the flushing gas does not need to be at high pressure, whereby no excessive energy is required to pressurize the flushing gas.

Preferably, the predetermined amount of flushing gas is up to three times the volume of the hopper chamber to ensure that all air has been evacuated from the hopper chamber.

The material hopper may comprise a gas inlet with an associated gas inlet valve and a gas outlet with an associated gas outlet valve. The method then preferably comprises closing the inlet seal valve and opening the gas outlet valve before opening the gas inlet valve; allowing a predetermined amount of flushing gas to flow through the hopper chamber and to escape via the gas outlet before closing the gas outlet valve and pressurizing the hopper chamber. This allows the hopper chamber to be flushed of air before it is pressurized. The gas outlet further allows the flushing gas to be fed into a gas evacuation line for recycling or disposal thereof.

According to one embodiment of the present invention, the flushing gas is received from an installation comprising a combustion process. The flushing gas may e.g. be an exhaust gas received from a regenerator. Such exhaust gasses generally comprise a high concentration in $CO_2$ and are readily available in blast furnace installations.

According to one embodiment of the present invention, the flushing gas is received from a $CO_2$ removal unit, the $CO_2$ removal unit extracting carbon dioxide containing gas from a top gas recovered from the blast furnace. The use of $CO_2$ from a $CO_2$ removal unit as flushing gas allows the hopper chamber to be filled with a non-combustible gas that is readily available in top gas recirculation installations. Indeed, $CO_2$ must be removed from the recovered top gas before it is reused. Instead of discarding the removed $CO_2$, it can now be used to flush the hopper chamber of the material hopper.

Preferably, the carbon dioxide is removed from the recovered top gas by Pressure Swing Adsorption or Vacuum Pressure Swing Adsorption.

Preferably, the flushing gas is fed through a booster unit and buffer tank before being fed to the hopper chamber, in particular if the flushing gas is not pressurized or not sufficiently pressurized.

According to one embodiment of the present invention, after feeding the predetermined amount of flushing gas through the hopper chamber, the hopper chamber is sealed and pressurized by feeding further flushing gas as pressurizing gas into the hopper chamber. After flushing of the hopper chamber, the latter can be pressurized by feeding more flushing gas into the hopper chamber. As all the air has been evacuated from the hopper chamber, deflagrations can be avoided, even in the presence of CO in the hopper chamber. It should also be noted that if the hopper chamber is pressurized using flushing gas, it is possible to be less strict on the flushing volume. Indeed, as the flushing gas is a non-combustible gas, it does not react with any $O_2$ that might still be present in the hopper chamber, whereby deflagrations can be avoided.

According to another embodiment of the present invention, after feeding the predetermined amount of flushing gas through the hopper chamber, the hopper chamber is sealed and pressurized by feeding semi-clean top gas as pressurizing gas into the hopper chamber. As all the air has been evacuated from the hopper chamber, deflagrations can be avoided, even in the presence of CO in the hopper chamber. Due to the absence of $O_2$, semi-clean gas, which may be a combustible gas, can be fed into the hopper chamber without causing deflagrations. This is particularly advantageous because semi-clean gas is still pressurized when it exits the secondary cleaning stage. It is therefore not necessary to invest excessive energy to increase the pressure of the pressurizing gas.

Preferably, the semi-clean top gas is extracted from top gas recovered from the blast furnace after it has passed through a primary cleaning stage for producing a partially cleaned top gas and through a first step of a secondary cleaning stage for producing a semi-clean top gas. The cleaning of the recovered top gas may comprise feeding the recovered top gas through a primary cleaning stage, generally a dry cleaning stage, for producing a partially cleaned top gas; feeding the partially cleaned top gas through a secondary cleaning stage, generally a wet cleaning stage, for producing a cleaned top gas; and feeding the cleaned top gas through a drying stage for drying the cleaned top gas. It should be noted that, instead of the wet cleaning stage, a further dry cleaning stage may be provided.

The secondary cleaning stage may comprise a first step wherein the partially cleaned top gas is pre-washed and cooled for producing semi-clean gas; and a second step wherein the partially cleaned top gas is further washed and expanded.

Advantageously, the recovered top gas is, after removing the carbon dioxide therefrom, fed back into the furnace as reducing gas.

The gas recovered from the hopper chamber may be recycled and, according to various embodiments of the invention, be fed into the secondary cleaning stage; and/or be fed to a casthouse dedusting system; and/or be fed into a portion of the recovered carbon dioxide not used as flushing gas, e.g. into a $CO_2$ circuit. Preferably, the gas recovered from the hopper chamber is fed through a filter arrangement before being fed into the portion of recovered carbon dioxide not used as flushing gas.

The charging device of the present invention may be of the Bell Less Top type, is however not limited thereto.

BRIEF DESCRIPTION OF THE DRAWINGS

Preferred embodiments of the invention will now be described, by way of example, with reference to the accompanying drawings, in which.

DETAILED DESCRIPTION

Figure 1:
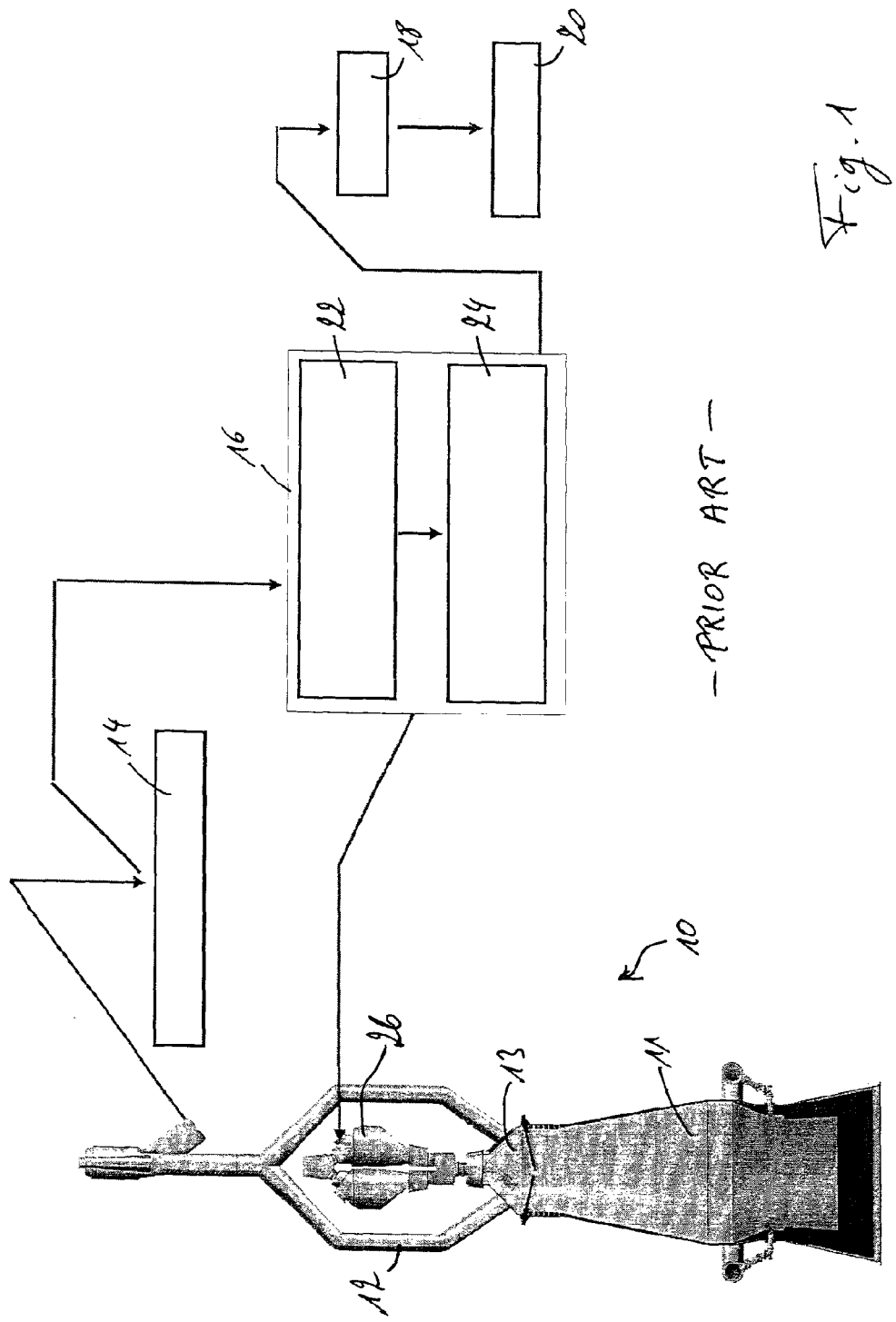
FIG. 1 is a schematic view of a blast furnace installation according to the prior art, comprising a blast furnace and a top gas cleaning installation.

FIG. 1 generally shows a prior art blast furnace installation 10 comprising a blast furnace 11 and piping 12 for recovering top gas from a top section 13 of the blast furnace 11. The recovered top gas is fed through a primary cleaning stage 14 and a secondary cleaning stage 16 before it is dried in a drying unit 18 and fed to a gas circuit 20. The secondary cleaning stage 16 comprises a primary prewashing and cooling stage 22 and a subsequent purification stage 24 wherein the gas is expanded. Semi-clean gas is extracted after the primary prewashing and cooling stage 22 and fed into a hopper chamber of a material hopper 26 for pressurizing the latter. Before the purification stage 24, the top gas is still at a relatively high pressure but must be compressed up to a pressure slightly above blast furnace pressure.

Figure 2:
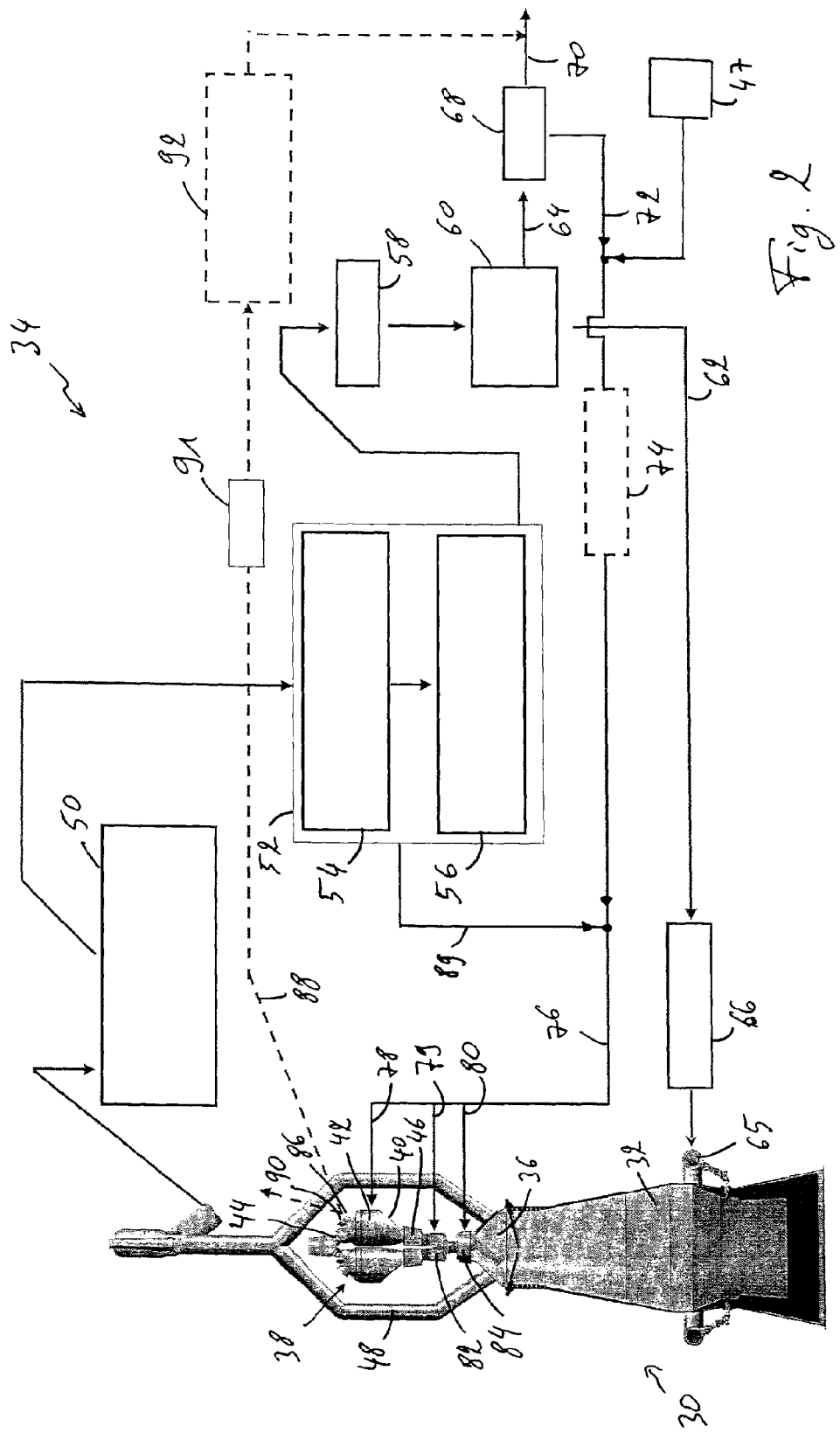
FIG. 2 is a schematic view of a blast furnace installation according to a first embodiment of the present invention, comprising a blast furnace and a top gas recycling installation.
Figure 3:
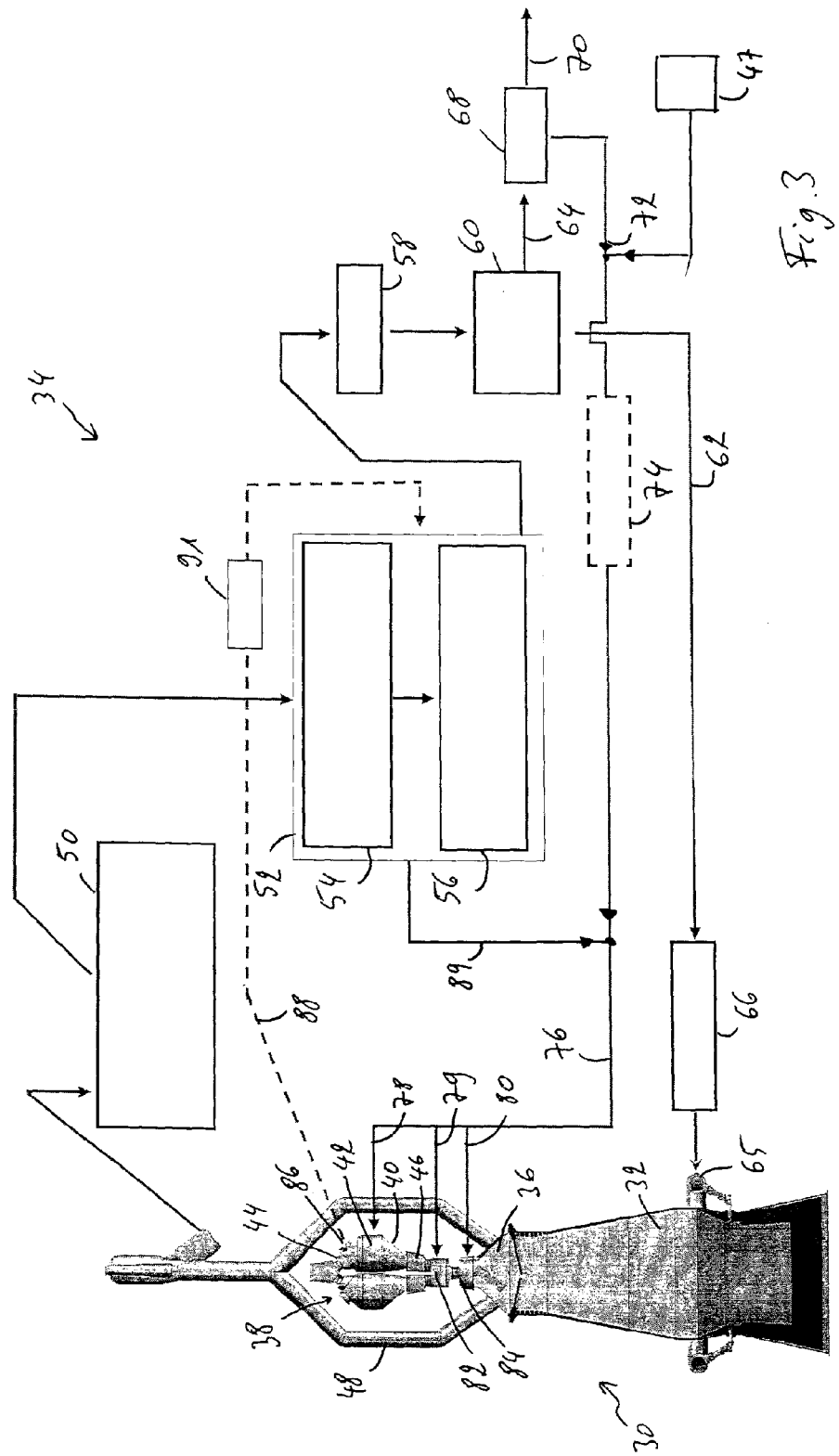
FIG. 3 is a schematic view of a blast furnace installation according to a second embodiment of the present invention.
Figure 4:
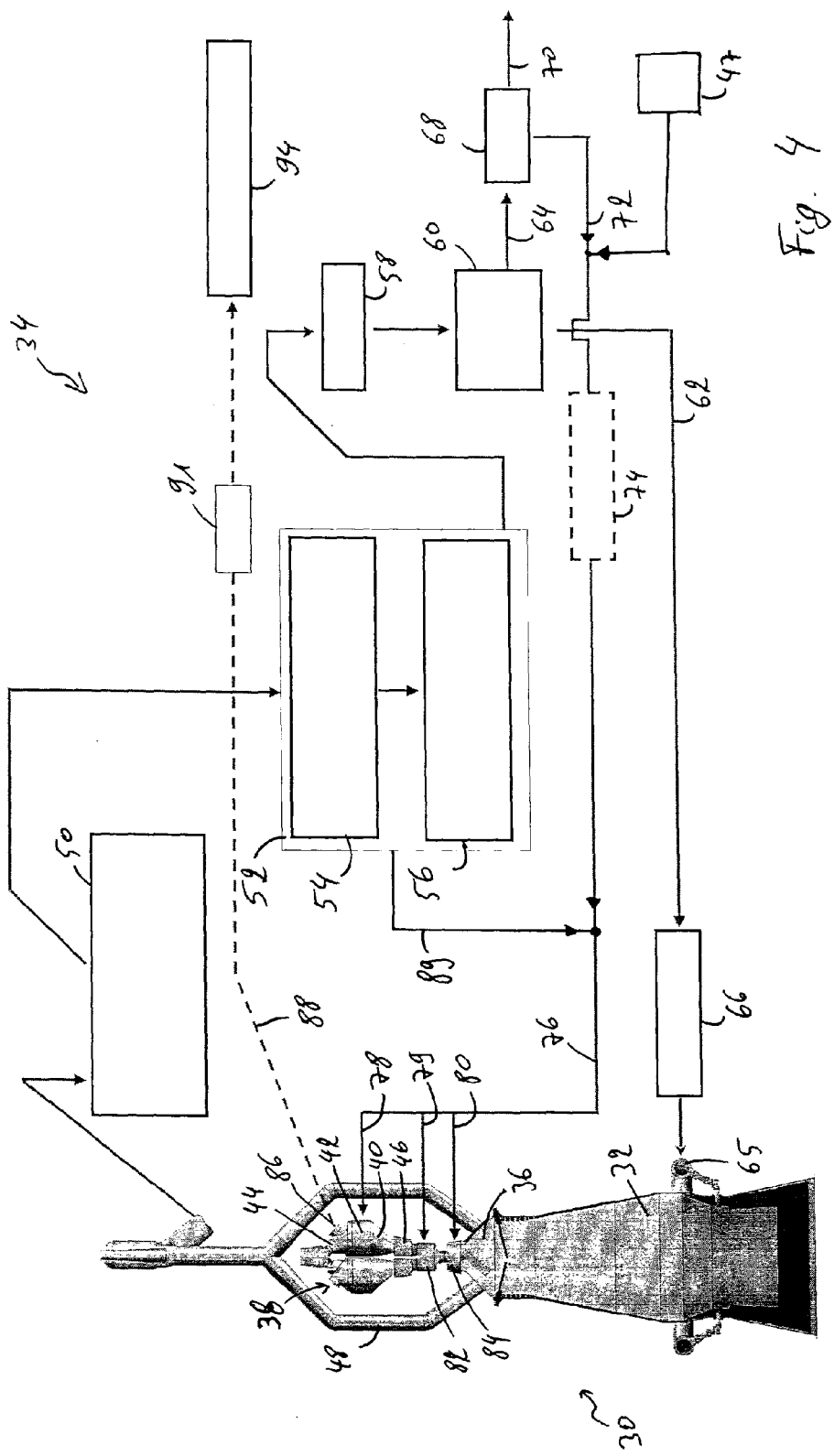
FIG. 4 is a schematic view of a blast furnace installation according to a third embodiment of the present invention.

FIGS. 2 to 4 show a blast furnace installation 30 according to the present invention, comprising a blast furnace 32 and a top gas recycling installation 34. A first embodiment of such a blast furnace installation 30 is shown in FIG. 2. At the top end 36 of the blast furnace 32, a charging device 38 is arranged for feeding a burden to the shaft furnace 32. The charging device 38 comprises, in the embodiment shown, two material hoppers 40, each having a hopper chamber 42 therein for temporarily storing a burden. The material hopper 40 comprises a material inlet aperture and a material discharge aperture for receiving and discharging a burden. An inlet seal valve 44 is associated with the material inlet aperture for sealingly closing the latter. Similarly, a material discharge valve 46 and a discharge seal valve (not shown) are associated with the material discharge aperture for sealingly closing the latter.

In operation, in order to feed a burden to the blast furnace, the material discharge valve 46 and discharge seal valve are closed and the inlet seal valve 44 is opened so as to feed the burden into the hopper chamber 42 of the material hopper 40. Once the desired amount of burden is in the hopper chamber 42, the inlet seal valve 44 is closed. The hopper chamber 42 is then flushed by feeding flushing gas into the hopper chamber 42 as will be described hereunder. Subsequently, the hopper chamber 42 is then pressurized by feeding pressurizing gas into the hopper chamber 42. When the hopper chamber 42 is sufficiently pressurized, the material discharge valve 46 and the discharge seal valve are opened and the burden is transferred to the blast furnace 32. The operation of the blast furnace itself is well known and will not be further described herein.

The flushing of the hopper chamber 42 is, according to the present invention, carried out by means of a flushing gas comprising at least 75% $CO_2$. The flushing gas may be an exhaust gas received from a regenerator 47 or any other installation comprising a combustion process. Such exhaust gases generally comprise a high concentration in $CO_2$ and are readily available in blast furnace installations 30. Alternatively, the flushing gas may be a $CO_2$ rich gas received from a $CO_2$ removal unit 60 of the top gas recycling installation 34, which will be described in more detail later.

The top gas recycling installation 34 comprises means for recovering top gas from the blast furnace 32, for treating the recovered top gas and for injecting the treated top gas back into the blast furnace 32. The blast furnace top gas is recovered from the top end 36 of the blast furnace 32 and first fed via a pipe arrangement 48 to a primary gas-cleaning unit 50, wherein the recovered top gas is subjected to a primary cleaning stage for reducing the amount of dust or foreign particles from the recovered to gas. The primary gas-cleaning unit 50 is a dry cleaning stage comprising e.g. an axial cyclone or a dust catcher.

After passing through the primary gas-cleaning unit 50, the now partially cleaned top gas is fed to secondary gas-cleaning unit 52, wherein the recovered top gas is subjected to a secondary cleaning stage, generally a wet cleaning stage. In the secondary gas-cleaning unit 52, the partially cleaned top gas is generally first fed through a pre-washing and cooling stage 54 wherein the top gas is sprayed with water. Subsequently, the partially cleaned top gas is fed through a purification stage 56, wherein the top gas is expanded as it passes through one or more Venturi-type annular passages.

From the secondary gas-cleaning unit 52, the cleaned top gas is fed through a drying unit 58 before being fed to a $CO_2$ removal unit 60, wherein the $CO_2$ content in the top gas is reduced. The $CO_2$ removal unit 60 may be a PSA/VPSA installation, producing a first stream of gas 62 rich in CO and $H_2$ and a second stream of gas 64 containing mainly $CO_2$. The first stream of gas 62 may be used as reduction gas and may be fed back into the blast furnace 32 via a tuyere arrangement 65 after being heated to a temperature of at least 900° C., e.g. by means of hot stoves 66.

The second stream of gas 64 is divided at a distribution point 68 into a first portion 70 and a second portion 72. While the first portion 70 of the second stream of gas 64 is disposed of, the second portion 72 of the second stream of gas 64 may be used as flushing gas for the material hopper 42. This flushing gas may be fed through a booster unit and buffer tank 74. Such a booster unit and buffer tank 74 may indeed be necessary for compressing the flushing gas, in particular if the $CO_2$ removal unit 60 does not comprise a cryogenic unit.

The flushing gas is fed via a feed line 76 to the charging device 38. The feed line 76 may comprise a first arm 78 for feeding flushing gas into the hopper chamber 42 of the material hopper 40. The feed line 76 may however further comprise a second arm 79 and/or a third arm 80 for feeding flushing gas to a valve casing 82 and/or a chute transmission gearbox 84 respectively.

The flushing gas fed into the hopper chamber 42 via the first arm 78 allows flushing the hopper chamber 42 by forcing any air trapped in the hopper chamber 42 out of the latter, thereby avoiding the risk of deflagrations during the pressurizing of the hopper chamber 42. The flushing gas fed into the valve casing 82 and the chute transmission gearbox 84 via the second and third arms 79, 80 serves to maintain an overpressure in these components, i.e. the pressure in these components is kept slightly above the blast furnace pressure. The flushing gas may also serve as emergency cooling for the valve casing 82 and the chute transmission gearbox 84.

The material hopper 40 may further comprise a gas outlet 86 connected to a gas evacuation line 88 for allowing gas to escape from the hopper chamber 42. According to the embodiment of FIG. 2, the evacuation line 88 feeds the gas recovered from the hopper chamber 42 into the first portion 70 of the second stream of gas 64 for disposal thereof.

The material hopper 40 may further comprise an atmospheric port 90. When the material hopper 40 is to be flushed, the atmospheric port 90 and/or the gas outlet 86 remain open while the flushing gas is fed into the hopper chamber 42 so as to allow any oxygen in the hopper chamber 42 to be evacuated. Once a predetermined amount of flushing gas has been fed into the hopper chamber 42, the atmospheric port 90 and the gas outlet 86 are closed and the material hopper 40 is pressurized.

The gas evacuation line 88 further also comprises a filter arrangement 92, through which the gas recovered from the hopper chamber 42 is led before it is fed into the first portion 70 of the second stream of gas 64. The filter arrangement 92 may e.g. comprise a static-electric filter and/or a bag filter for avoiding that dust particles are fed to the first portion 70 of the second stream of gas 64.

Furthermore, an ejector 91 is arranged in the gas evacuation line 88. Such an ejector uses the Venturi effect of a converging-diverging nozzle to convert the pressure energy of a motive fluid to velocity energy, which creates a low-pressure zone that draws in and entrains a suction fluid. Hence, the ejector 91 may be used to draw gas out of the hopper chamber 42 thereby depressurizing the hopper chamber 42 down to atmospheric pressure.

It should be noted that after the flushing of the hopper chamber 42, pressurizing gas is fed through the feed line 76 into the hopper chamber 42. During the pressurization of the hopper chamber 42, the feed line 76 may be fed with flushing gas coming from the regenerator 47 or the $CO_2$ removal unit 60. Alternatively, the feed line 76 may also be fed with semi-clean gas 89 coming from the secondary gas-cleaning unit 52. Indeed, the use of semi-clean gas 89 is possible due to the fact that any $O_2$ has been evacuated from the hopper chamber 42 by the flushing gas during the flushing step.

A second embodiment of a blast furnace installation 30 according to the invention is shown in FIG. 3. Most of the features of this embodiment are identical to the ones of the first embodiment and will therefore not be repeated. According to this embodiment, however, the gas evacuation line 88 does not feed the gas recovered from the hopper chamber 42 to the first portion 70 of the second stream of gas 64. Instead, the recovered gas is fed back into the secondary gas-cleaning unit 52, between the pre-washing and cooling stage 54 and the purification stage 56. This allows the recovered gas to be cleaned and fed through the $CO_2$ removal unit 60 again.

A third embodiment of a blast furnace installation 30 according to the invention is shown in FIG. 4. Most of the features of this embodiment are identical to the ones of the first embodiment and will therefore not be repeated. According to this embodiment, however, the gas evacuation line 88 does not feed the gas recovered from the hopper chamber 42 to the first portion 70 of the second stream of gas 64. Instead, the recovered gas is fed to a casthouse dedusting system 94.

The invention claimed is:

1. A method for feeding a burden to a blast furnace, said method comprising:
    providing a charging device having at least one material hopper, said material hopper comprising a hopper chamber, a material inlet aperture for feeding a burden into said hopper chamber, and a material discharge aperture for feeding a burden from said hopper chamber to said blast furnace; said material inlet aperture having an associated inlet seal valve for opening and closing said material inlet aperture and said material discharge aperture having an associated material discharge valve for opening and closing said material discharge aperture;
    opening said material inlet aperture and closing said material discharge aperture;
    feeding a burden into said hopper chamber through said material inlet aperture;
    closing said inlet seal valve;
    pressurizing said hopper chamber by feeding pressurizing gas into said hopper chamber;
    opening said material discharge valve and feeding said burden from said hopper chamber to said blast furnace; and
    feeding a predetermined amount of flushing gas through said hopper chamber before pressurizing said hopper chamber, wherein said flushing gas comprises at least 75% carbon dioxide.

2. The method according to claim 1, wherein said predetermined of amount flushing gas is up to three times the volume of said hopper chamber.

3. The method according to claim 1, wherein
    said material hopper comprises a gas inlet with an associated gas inlet valve and a gas outlet with an associated gas outlet valve, wherein said method comprises:
    closing said inlet seal valve and opening said gas outlet valve before opening said gas inlet valve; and
    allowing a predetermined amount of flushing gas to flow through said hopper chamber and to escape via said gas outlet before closing said gas outlet valve and pressurizing said hopper chamber.

4. The method according to claim 3, wherein said flushing gas is received from a $CO_2$ removal unit, said $CO_2$ removal unit extracting carbon dioxide containing gas from a top gas recovered from said blast furnace.

5. The method according to claim 4, wherein said carbon dioxide is extracted from said recovered top gas by Pressure Swing Adsorption or Vacuum Pressure Swing Adsorption.

6. The method according to claim 4, wherein said recovered top gas is, after removing said carbon dioxide therefrom, fed back into said furnace as reducing gas.

7. The method according to claim 4, wherein said top gas recovered from said blast furnace is recycled and
    fed into a secondary cleaning stage; and/or
    fed to a casthouse dedusting system; and/or
    fed into a portion of recovered carbon dioxide not used for feeding said hopper chamber.

8. The method according to claim 1, wherein said flushing gas is received from an installation comprising a combustion process.

9. The method according to claim 8, wherein said flushing gas is an exhaust gas received from a regenerator.

10. The method according to claim 1, wherein said flushing gas is fed through a booster unit and buffer tank before being fed to said hopper chamber.

11. The method according to claim 1, wherein
    after feeding said predetermined amount of flushing gas through said hopper chamber, said hopper chamber is sealed and pressurized by feeding further flushing gas as pressurizing gas into said hopper chamber.

12. The method according to claim 1, wherein
    after feeding said predetermined amount of flushing gas through said hopper chamber, said hopper chamber is sealed and pressurized by feeding semi-clean top gas as pressurizing gas into said hopper chamber.

13. The method according to claim 12, wherein
    said semi-clean top gas is extracted from top gas recovered from said blast furnace after it has passed through a primary cleaning stage for producing a partially cleaned top gas and through a first step of a secondary cleaning stage for producing a semi-clean top gas.

14. The method according to claim 13, wherein said secondary cleaning stage comprises:
    a first step wherein said partially cleaned top gas is pre-washed and cooled for producing a semi-clean top gas; and
    a second step wherein said semi-clean top gas is further washed and expanded.

15. The method according to claim 1, wherein said charging device comprises a Bell Less Top type charging device.

* * * * *